United States Patent [19]

Ohsumi

[11] Patent Number: 5,122,741

[45] Date of Patent: Jun. 16, 1992

[54] HOLDING MEMBERS FOR SENSOR AND WIRING MEMBERS OF MAGNETIC ROTARY ENCODER

[75] Inventor: Yasuhisa Ohsumi, Ohkaji, Japan

[73] Assignee: Alps Electric Co., Ltd., Tokyo, Japan

[21] Appl. No.: 587,303

[22] Filed: Sep. 24, 1990

[30] Foreign Application Priority Data

Dec. 6, 1989 [JP] Japan ............... 1-40630[U]
Dec. 12, 1989 [JP] Japan ............... 1-142742[U]

[51] Int. Cl.$^5$ .................................. G01B 7/30
[52] U.S. Cl. .................. 324/207.13; 324/207.25
[58] Field of Search ............ 324/207.11, 207.12, 324/207.14, 207.20, 207.21, 207.22, 207.23, 207.24, 207.25, 207.26, 249-252; 174/152 G, 153 G, 656; 361/427, 428, 429

[56] References Cited

U.S. PATENT DOCUMENTS

| | | | |
|---|---|---|---|
| 3,924,086 | 12/1975 | Ochsner | 200/81.9 M |
| 4,319,188 | 3/1982 | Ito et al. | |
| 4,409,585 | 10/1983 | Rousseau | 324/207.22 X |
| 4,663,601 | 5/1987 | Troutman et al. | 324/207.25 X |
| 4,673,876 | 6/1987 | Paulsen | 324/207.21 |
| 4,754,221 | 6/1988 | Ao et al. | 324/207.21 |
| 4,769,600 | 9/1988 | Ito | 324/207.25 X |
| 4,771,240 | 9/1988 | Meyer et al. | 324/207.21 X |
| 4,851,611 | 7/1989 | DeConcini et al. | 174/65 G X |
| 4,897,527 | 7/1989 | Dohogne | 324/207.20 X |

*Primary Examiner*—Kenneth A. Wieder
*Assistant Examiner*—W. S. Edmonds
*Attorney, Agent, or Firm*—Guy W. Shoup; David W. Heid

[57] ABSTRACT

A magnetic encoder has a wiring structure which includes a retaining member 20 for retaining the magneto-sensitive element 37 in a certain positional relationship with respect to a surface on which a magnetic code is formed. This retaining member 20 is equipped with: a pair of gripping members 21c protruding toward the surface on which the magnetic code is formed; and an abutting member 21a adapted to abut against the back surface of the magneto-sensitive element 37 so as to keep the element 37 a certain distance apart from the surface on which the magnetic code is formed. The magneto-sensitive element 37, which is positioned by the abutting member 21a and the gripping members 21c, is fixed to the retaining member 20 by means of an adhesive agent or the like. The wiring structure may also include a protecting section 22, which is integrally formed with the retaining member 20 and which separates wiring member 35, or wiring member 50 for external electrical connection from a cover 40 of the encoder, thus preventing it from coming into contact with the cover 40.

15 Claims, 5 Drawing Sheets

HOLDING MEMBERS FOR SENSOR AND WIRING MEMBERS OF MAGNETIC ROTARY ENCODER

BACKGROUND OF THE INVENTION

1. Field of the Invention

This invention relates to a mounting structure for a magnetic encoder, and in particular, to an improvement in a mounting structure for the magneto-sensitive element of a magnetic encoder.

Pertaining to such a mounting structure, this invention particularly relates to an improvement in its wiring structure.

2. Description of the Related Art

As a result of the recent technical improvement in the magnetic-reluctance-effect element as a magneto-sensitive element, it has become the common practice to employ a relatively expensive high-resolution type magnetic encoder in general equipment. The most typical employment of such a magnetic encoder is to attach it to the end surface of a rotary motor.

In the following, a typical conventional magnetic encoder of this type will be described with reference to FIGS. 8 to 10.

FIG. 8 is a sectional view showing the essential part of the encoder, which has a magnetic drum 1, constituting a magnetic scale, whose peripheral surface is continuously magnetized through horizontal magnetization at, for example, equal pitches. The magnetization pattern (not shown) is such that the adjacent magnetic-pole pairs are of opposed polarity as N,N,S,S,N,N, ... and arranged parallel with respect to the direction of movement, i.e., the direction of rotation. A rotating shaft 3, which is a movable component, protrudes from a rotating machine 2 consisting of a motor or the like, which is the object of the monitoring. This rotating shaft 3 is fixed to the center of the magnetic drum 1. Formed on that end surface of the rotating machine 2 to which this encoder is attached, is a step section 2a, into which a ring-like base member 4 is screwed. The upper surface of this base member 4 constitutes a reference plane 4a, which is perpendicular to the axis of the rotating shaft 3. Screwed to this reference plane 4a is a retaining member 5. A magnetic sensor 6 having magnetic-reluctance-effect elements is fixed to this retaining member 5 by means of a fluid additive. The magneto-sensitive plane of this magnetic sensor 6 faces the peripheral surface of the magnetic drum 1, on which the magnetic pattern is provided, with a predetermined gap (a magnetic gap g which is, for example, 100 μm) therebetween.

The encoder includes a printed board 7. Mounted on this printed board 7 is a circuit part 11, which processes electric signals emitted from the magnetic sensor 6. This printed board 7 is placed over the upper end surface of the magnetic drum 1 by means of a screw 12, which is inserted through a support cylinder 9 before it is screwed into the base member 4, so that the printed board 7 is not in contact with other parts. The printed board 7 is connected to the magnetic sensor 6 through a lead wire 8. An external wiring cable (not shown) extends from the printed board 7 for the electrical connection with an external circuit.

A cover member 10, which covers these encoder parts and through which the external wiring cable can extend to the external circuit, is attached to that end surface of the rotating machine 2 to which these parts are attached, in such a manner that no dust is allowed to enter.

The magnetic-reluctance-effect elements, which constitute the magnetic sensor 6, are grouped into two element groups. Supposing the magnetization pattern is at equal pitches p, these two element groups are shifted from each other by $p(n+\frac{1}{2})$ (n is an integral number). Each of these magnetic-reluctance-effect elements extends in a direction which is perpendicular to the magnetic path of the magnetic pattern, and exhibits form magnetic anisotropy when a bias current flows in the direction in which each of them extends. One rotation of the magnetic drum 1 causes the electrical resistance in each current path to change in correspondence with the density of the magnetic flux resulting from the magnetic pattern, which is perpendicular to the longitudinal direction in which each magnetic-reluctance-effect element extends. Then, the magnetic sensor 6 generates a pair of detection signals which retain an electrical-angle phase difference of 90°. These detection signals are transmitted through the lead wire 8 to the printed board 7, where they are processed by processing circuits provided in the printed board 7, including an amplifier, a waveform shaping circuit and an impedance matching circuit, before they are transmitted to the external circuit as output signals, which are in the form of a pair of incremental square-wave pulses with an electrical-angle phase difference of 90°. The external circuit, which receives these output signals, discerns the direction of rotation from the leading edge condition of these square waves, and the amount of rotation from the number of pulses.

The construction of a conventional magnetic encoder of the above-described type, which has the external wiring cable for electrical connection with the external circuit, will be described with reference to FIG. 9, which is a sectional view showing the essential part of the encoder, and FIG. 10, which is an enlarged sectional view of the same.

As shown in FIG. 9, the housing 4 is fixed to one end surface of the motor case 2c. The magnetic drum 1 is fixed to the end of the rotating shaft 3, which protrudes through an opening provided at the center of the housing 4. The retaining member 5 is screwed to the mounting surface of the housing 4, which is perpendicular to the axis of the rotating shaft 3. Fixed to this retaining member 5 is the magneto-sensitive element 6, which faces the magnetized peripheral surface of the magnetic drum 1, with a small gap therebetween.

The printed board 7, on which circuit parts 11 for signal processing are mounted, is firmly supported by the housing 4 in such a manner that it faces the upper end surface of the magnetic drum 1 without being in contact with other parts. The printed board 7 and the magneto-sensitive element 6 are connected to each other through the flexible flat cable 8. The printed board 7 is connected to the external circuit through a wire harness 13, which constitutes the external wiring member.

Situated over the motor end surface to which these encoder parts are attached, is the cover member 10, which is fixed to the peripheral surface of the motor case 2c. This cover member 10 has in its upper section a hole 10a for external wiring. Fitted into this hole 10a is a bush 14, through which the wire harness 13 is passed, the bush 14 being made of an elastic material and constituting a protecting member. This bush 14 is attached to the inner periphery of the hole 10a so as to protect the wire harness 13 from the edges of the hole 10a, which would otherwise damage the wire harness 13 when external stresses are applied to it, resulting in problems such as disconnection. This wire harness 13 is secured inside the cover member 10 by means of a bundle holder. This bundle holder, which is provided inside the cover member 10, abuts against the bush 14 so that no force is directly applied to the connecting section between the printed board 7 and the wire harness 13 when the wire harness 13 is pulled on the outside.

The cylindrical bush 14 has on its outer periphery a groove, which covers, when the bush 14 attached to the cover member 10, the entire inner periphery of the hole 10a, engaging with that portion of the cover member 10 which is around the hole 10a so that the bush 14 may not be easily detached from the hole 10a.

FIG. 10 shows the construction of another type of conventional external wiring structure, which is an improvement over the above-described one in terms of the ease with which the mounting and maintenance operations can be conducted.

As shown in FIG. 10, a cable 13a, which consists of a plurality of lead wires bundled together and outwardly covered, extends to the external circuit through a U-shaped cutout 10c provided at the motor side end of a cover member 10b, which covers the encoder parts attached to the end surface of the motor. A bush 14a, which is made of a flexible material and which is formed as an integral part, is provided on that outer peripheral portion of the cable 13a which is situated in the cutout 10c. Provided on the outer periphery of this bush 14a is a groove, which is to be engaged with the cutout 10c so as to prevent external tensile forces applied to the cable 13a from being directly applied to the connecting section between the printed board 7 and the cable 13a. The cover member 10b is fixed to the motor after the groove of the bush 14a, which is attached to the cable 13a at a predetermined position, is engaged with the cutout 10c. Thus, the bush 14a protects the cable 13a and the bush 14a is prevented from being detached.

Conventional encoders of the above-described types, however, have the following problems: the speediest way of conducting the operation of positioning the magnetic sensor 6 with respect to the retaining member 5 and fixing the former to the latter, is to adopt the method in which a jig is used. That is, the magnetic sensor 6 is held against the retaining member 5 at a predetermined position by means of a jig, with an ultraviolet-ray-curing-type adhesive applied therebetween. The two above components are fixed to each other by curing the adhesive through the application of ultraviolet rays. The jig has to continue to perform the above operation until the curing has been completed, which means a great number of jigs are necessary for mass production of such conventional encoders. In addition, this method involves the operation of removing the jig used when holding the magnetic sensor 6, with the result that a large space has to be utilized when conducting the mounting operation. Furthermore, the time needed for removing the jig after the curing has been completed has to be taken into account.

Accordingly, it is a first object of this invention to provide a magnetic encoder which can be manufactured without using a jig in order to temporarily retain the magnetic sensor.

Apart from the above problems, conventional wiring structures have the following problems: as described above, the bush 14, which is a separate component, is fitted into the hole 10a, and the wire harness 13 is passed through the bush 14, the wire harness 13 afterwards being secured by means of a bundle holder. Thus, this type of structure requires a large number of parts. Moreover, a lot of time has to be spent to engage the hole 10a with the groove of the bush 14, or shift the cover member 10 so that it may not be in the way when the wire harness 13 is connected to the printed board 7. In view of this, the structure of the above-described improvement, in which the groove of the bush 14a is slid into the U-shaped cutout 10c provided at the opening end of the cover member 10b, is advantageous since in this way the mounting time can be shortened. Furthermore, the structure which has a cable 13a as the external wiring member and in which the bush 14a is integrally formed around the cable 13a, is advantageous in that the cable can be secured more positively. Further, it obviates the operation of passing the cable through the bush, thus further shortening the mounting time. Moreover, it is advantageous in that the bush 14a can be mounted after the cable 13a has been connected to the printed board 7. This improvement over the conventional external wiring structures, however, is not without its problems. The operation of mounting the bush 14a is conducted on the cover member 10b. That is, the bush 14a, which is provided on the outer periphery of the cable 13a, has to be mounted on the cover member 10b while the groove of the bush 14a is slid along the U-shaped cutout 10c, which means this structure cannot be applied to larger motors. In addition, the structure is disadvantageous in terms of operational efficiency since it requires skill for to adjust operational power, for the operator has to hold the bush 14a, whose length is limited by the cable 13, with one hand, and the cover member 10b with the other hand.

Further, in the case where the bush 14a is integrally formed, the mounting operation area for the bush 14a is situated nearer to the motor side. If this condition is to be eliminated, it is necessary to lengthen that section of the cable which extends between the connecting section of the cable 13a and the position where the bush 14a is fixed. Accordingly, the magnetic encoder has to be a large one.

In view of this, it is a second object of this invention to provide a magnetic encoder which can be manufactured through a one-way mounting operation, which can be made smaller, and which has an external wiring structure that is of high quality and thus highly reliable.

SUMMARY OF THE INVENTION

In order to achieve these objects, this invention basically provides a magnetic encoder which includes a part that is to be attached to the mounting surface of the object of the monitoring, the mounting surface being kept in a certain positional relationship with respect to the movement of the magnetic scale of the encoder. The above-mentioned part is equipped with members having the functions of temporarily holding the magnetic sensor, protecting the wiring members, etc.

In accordance with a first aspect of this invention, the above first object is achieved by a magnetic encoder comprising: a magnetic scale adapted to move in accordance with the movement of an object to be monitored; a magnetic code formed on a surface which is perpendicular to the direction of movement of the above-mentioned magnetic scale; a magneto-sensitive element which faces the above-mentioned magnetic code and which is arranged in such a manner as to detect the relative movement condition of the above-mentioned magnetic scale; a retaining member for retaining the above-mentioned magneto-sensitive element in a certain positional relationship with respect to the surface on which the above-mentioned magnetic code is formed; a pair of gripping members which are fixed to the above-mentioned retaining member and which protrude toward the surface on which the above-mentioned magnetic code is formed; an abutting member which is fixed to the above-mentioned retaining member and which is adapted to abut against the above-mentioned magneto-sensitive element in a direction perpendicular to the direction in which the magneto-sensitive element is held between the above-mentioned gripping members, thereby keeping the distance between the above-mentioned magneto-sensitive element and the surface on which the above-mentioned magnetic code is formed constant; and a fixing means for fixing the above-mentioned magneto-sensitive element, which is positioned by the abutting member and the gripping members, to the above-mentioned retaining member.

In accordance with a second aspect of this invention, the above second object can be achieved by a magnetic encoder comprising: a cover member which covers a mounting surface, through which a movable section of an object of monitoring is protruding in order that the movement of said object may be monitored; a magnetic scale which is mechanically connected between the cover member and the above-mentioned mounting surface in such a manner that it can move with the above-mentioned movable section; a magnetic code formed on a surface which is perpendicular to the direction of movement of the magnetic scale; a magneto-sensitive element which is arranged in such a manner as to face the magnetic code and detect the relative movement condition of the above-mentioned magnetic scale; wiring members adapted to lead an output signal from the magneto-sensitive element to the exterior; a retaining member adapted to retain the wiring members between the cover member and the above-mentioned mounting surface; and a protecting section which is integrally formed with the above-mentioned retaining member and which separates an external wiring member, which is included in the above-mentioned wiring members retained by the retaining member and which passes between the above-mentioned cover member and the above-mentioned mounting surface, from the cover member so that this external wiring member will not come in contact with the cover member.

In accordance with the above-described first aspect of this invention, members for temporarily fixing the magneto-sensitive element are provided on the retaining member, to which the magneto-sensitive element, which is fixed to the mounting surface that is kept in a certain positional relationship with respect to the movement of the magnetic scale. With this structure, the operation of temporarily fixing the magneto-sensitive element can be conducted without using a temporary-fixing jig and it is not necessary to cancel the temporary fixing after the fixing has been completed, thus simplifying the mounting process.

In accordance with the above-described second aspect of this invention, a protecting section adapted to protect the outlet section of the external wiring member is formed integrally with the retaining member, which is fixed to the mounting surface that is kept in a certain positional relationship with respect to the movement of the magnetic scale and which holds the wiring members. With this construction, the mounting operation can be conducted in one direction using the mounting surface as a reference, thus shortening the mounting time.

DETAILED DESCRIPTION OF THE PREFERRED EMBODIMENTS

An embodiment in accordance with the first aspect of this invention will now be described with reference to FIGS. 1 to 3.

Figure 8:
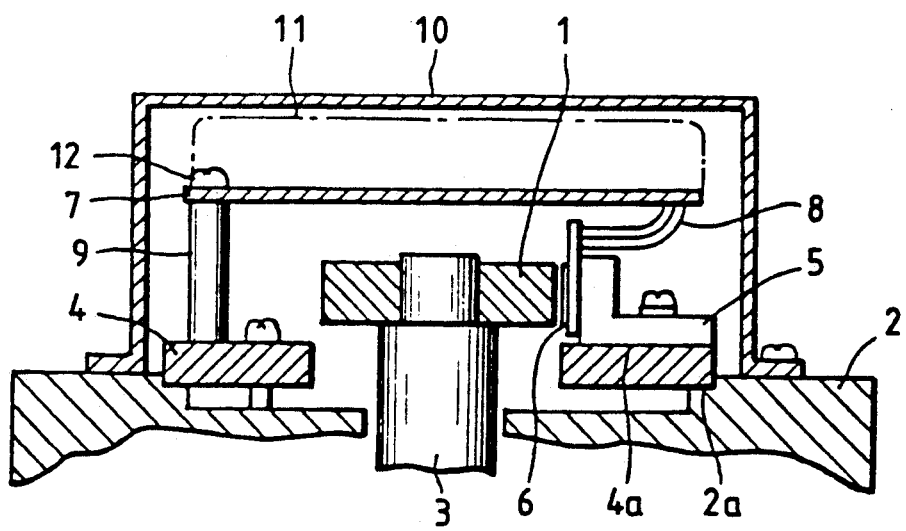
FIGS. 8 to 10 are views illustrating the structures of conventional encoders.

Here, a detailed description of the components which are identical with or which have the same function as those in the prior art described with reference to FIG. 8 will be omitted.

Figure 1:
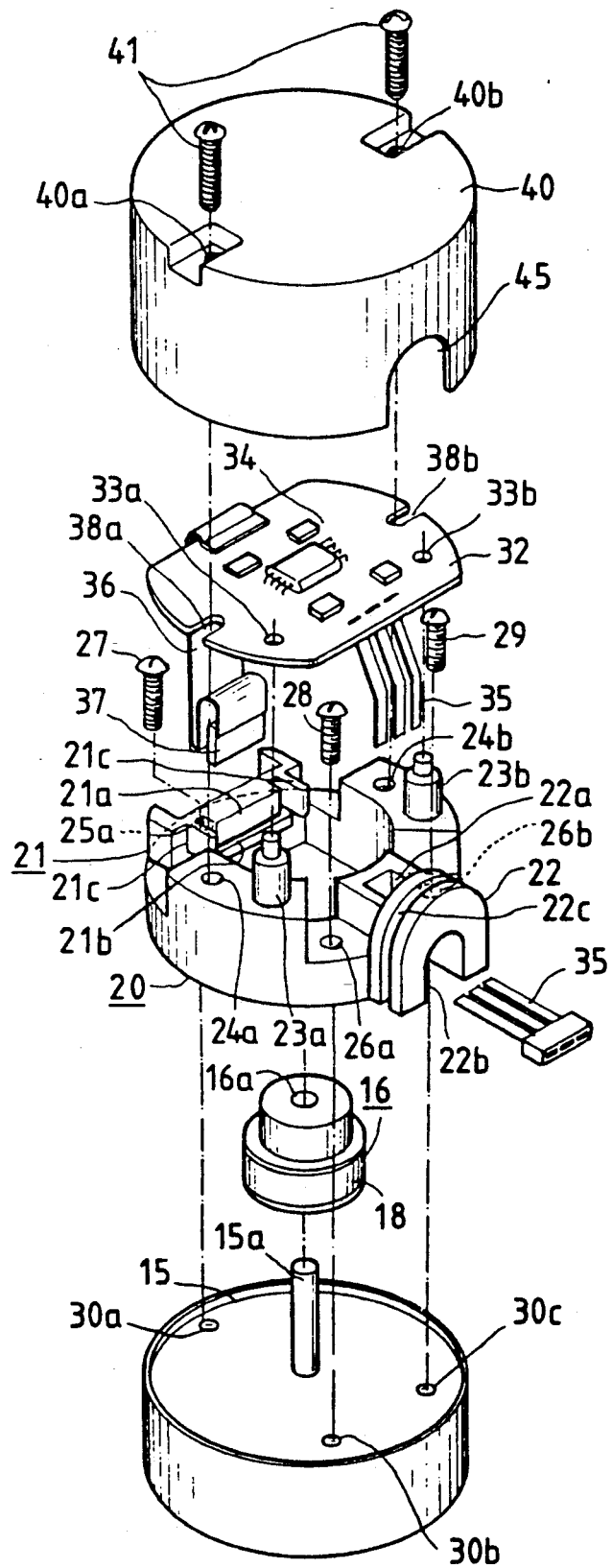
FIG. 1 is an exploded perspective view of a magnetic rotary encoder in accordance with the first and second aspects of this invention.

FIG. 1 is an exploded perspective view of this embodiment; FIG. 2 is a plan view showing the construction of the holder of the same; and FIG. 3 is a longitudinal sectional view of the essential part of the same.

As shown in FIG. 1, the rotating shaft 15a of a motor 15 is fitted into the mounting hole 16a of a magnetic drum 16, so that the magnetic drum 16, which constitutes the magnetic scale, rotates with the rotating shaft 15a.

This magnetic drum 16 is composed of a cylindrical section which is made of aluminum or the like and a magnetic body 18 which is formed on the peripheral surface of the cylindrical section. The magnetic body 18 is made of plastic magnet or the like. The peripheral surface of the magnetic body 18 is magnetized continuously at equal pitches; the magnetization pattern (not shown) is such that the adjacent magnetic-pole pairs are of opposed polarities as: N,S,S,N,N,S,. . . .

The reference numeral 20 indicates a guide member, which is formed as a ring, in which the magnetic drum 16 is to be disposed; this guide member 20 is fixed to the upper surface of the motor 15. A holder section 21 is formed integrally with the upper surface of this guide member 20 and protrudes therefrom. At the same time, a bush section 22 is formed integrally with the guide member 20 at a position facing the holder section 21. This bush section 22 has a top opening 22a and a side opening 22b.

Formed in that section of the upper surface of the guide member 20 which is between the holder section 21 and the bush section 22, are protrusions having respective support poles 23a, 23b and respective screw holes 24a, 24b. Further, a screw hole 25a is formed on the back side of the holder section 21 and screw holes 26a and 26b are respectively formed on both sides of the bush section 22.

To fix the guide member 20 to the motor 15, the magnetic drum 16 is placed within the guide member 20 and the screw holes 25a, 26a and 26b are mated with screw holes 30a to 30c formed in the end surface of the motor 15. The components are then fixed to each other by means of screws 27 to 29. Further, an adhesive is appropriately applied to the section where the guide member 20 abuts against the motor 15, thereby making the fixation more positive.

A printed board 32 is placed over the guide member 20 in such a manner as to cover the upper surface of the guide member 20. This printed board 32 has mounting holes 33a and 33b, into which the tips of the support poles 23a and 23b are inserted and then soldered thereto, thereby fixing the printed board 32 to the guide member 20.

Circuit parts 34 for signal processing circuits are mounted on this printed board 32, and a harness 35, which is connected to these circuit parts 34, extends from the printed board 32. Further, a magneto-sensitive element 37 is connected to the printed board 32 through a flexible flat cable 36.

In the condition where the printed board 32 has been fixed to the guide member 20, the harness 35 extends outwardly through the top opening 22a and the side opening 22b and is connected to an external control circuit (not shown). The magneto-sensitive element 37 is secured by the holder section 21.

The printed board 32 has cutouts 38a, 38b as positions corresponding to the screw holes 24a, 24b of the guide member 20. A cylindrical cap 40, which is disposed over the printed board 32, is equipped with a cutout 45. This cutout 45 is engaged with a groove 22c formed in the bush section 22. At the same time, the lower edge of the cylindrical cap 40 is engaged with the outer peripheral surface of the guide member 20, and screws 41 are inserted through mounting holes 40a, 40b formed in the cap 40 and then threaded into the screw holes 24a, 24b, thereby fixing the cap 40 to the guide member 20.

The holder section 21 includes: a fixing surface 21a, against which the back surface of the magneto-sensitive element 37 abuts; a bottom support section 21b, against which the bottom surface of the magneto-sensitive element abuts; and a pair of elastic support members, which elastically abut against the sides of the magneto-sensitive element 37.

Figure 2:
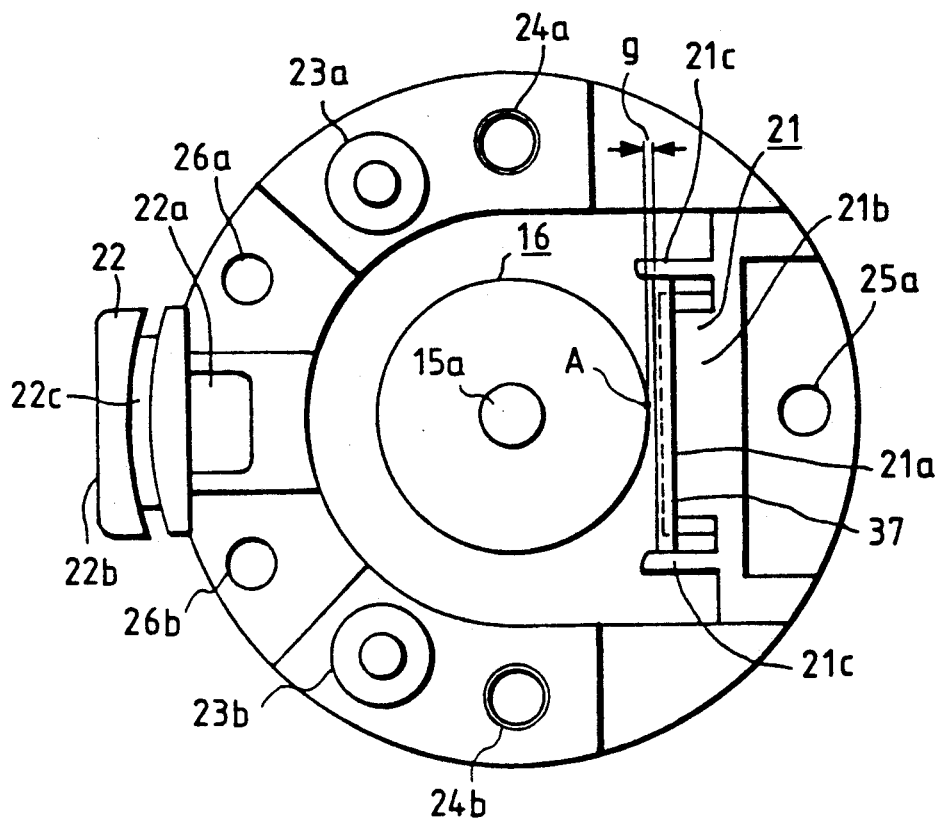
FIG. 2 is a plan view for illustrating the first aspect of this invention, illustrating the gap adjustment in the encoder of FIG. 1 is adjusted.
Figure 3:
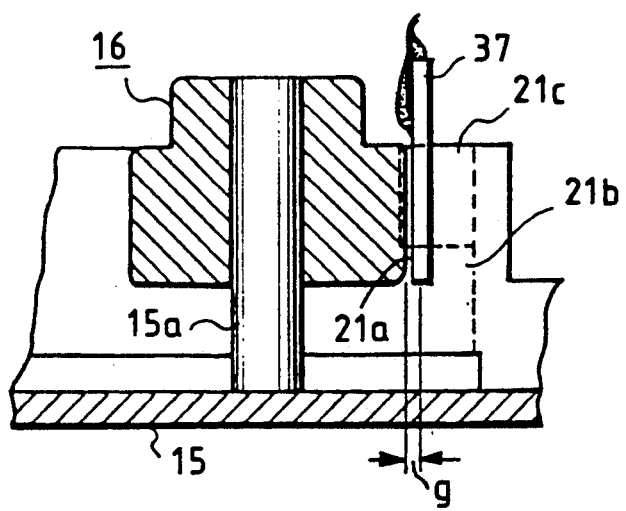
FIG. 3 is a sectional view showing the essential part of FIG. 2.

The fixing surface 21a, the bottom support section 21b and the elastic support members 21c are prepared in such a manner that the surface of the magneto-sensitive element 37 held by the holder section 21 is kept apart from the magnetization pattern formed on the peripheral surface of the magnetic drum 16 by a predetermined gap g (see FIGS. 2 and 3).

When attaching the magneto-sensitive element 37 to the holder section 21, the magneto-sensitive element 37 is first forced into the space between the elastic support members 21c deforming these elastic support members, with the result that the back surface of the magneto-sensitive element 37 abuts against the fixing surface 21a of the holder section 21 and that the bottom surface 65 thereof abuts against the bottom support section 21b, thus effecting temporary fixing. Afterwards, the space defined by the fixing surface 21a and the elastic support members 21c is filled with adhesive, thereby fixing the magneto-sensitive element 37 to the holder section 21.

Thus, the magneto-sensitive element 37 is temporarily fixed in a predetermined position, so that it faces the magnetization pattern of the peripheral surface of the magnetic drum 16 with a predetermined gap g therebetween. As a result, the rotation of the motor 15 causes an electrical signal of an optimum output value to be emitted from the magneto-sensitive element 37.

Thus, in accordance with this embodiment, the magneto-sensitive element 37 is forced into the space between the elastic support members 21c until it abuts against the bottom support section 21b and the fixing surface 21a, thereby fixing the magneto-sensitive element 37 temporarily to the holder section 21. The fixing is then completed by using an adhesive. Thus, the magneto sensitive element 37 can be fixed to the holder section 21 at a predetermined position through a simple operation and without using a jig, as in the prior art, or performing a bothersome adjusting work.

It will be understood that the application of this invention is not limited to the type of encoder of the above embodiment; it can also be applied to a linear encoder.

Next, embodiments in accordance with the second aspect of this invention will be described in detail with reference to FIG. 1 and FIGS. 4 to 7.

Figure 9:
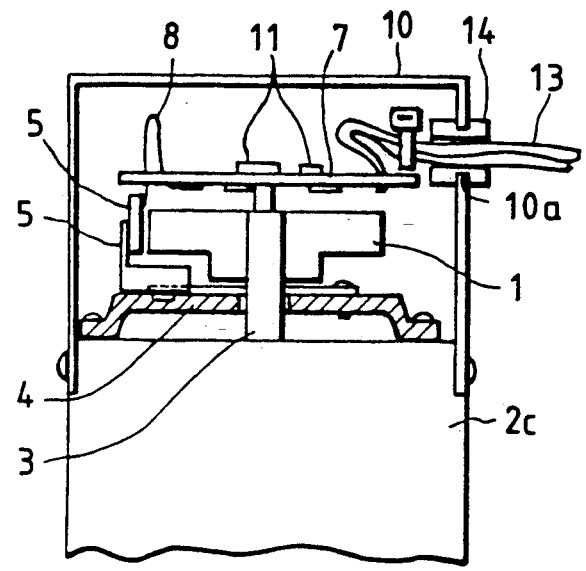
Figure 10:
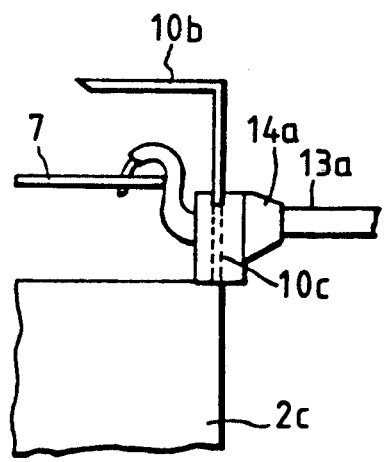

Here, a detailed description of the components which are identical with or which have the same functions as those of the prior art shown in FIGS. 9 and 10 or as those of the embodiment described with reference to FIGS. 1 to 3, will be omitted.

Figure 4:
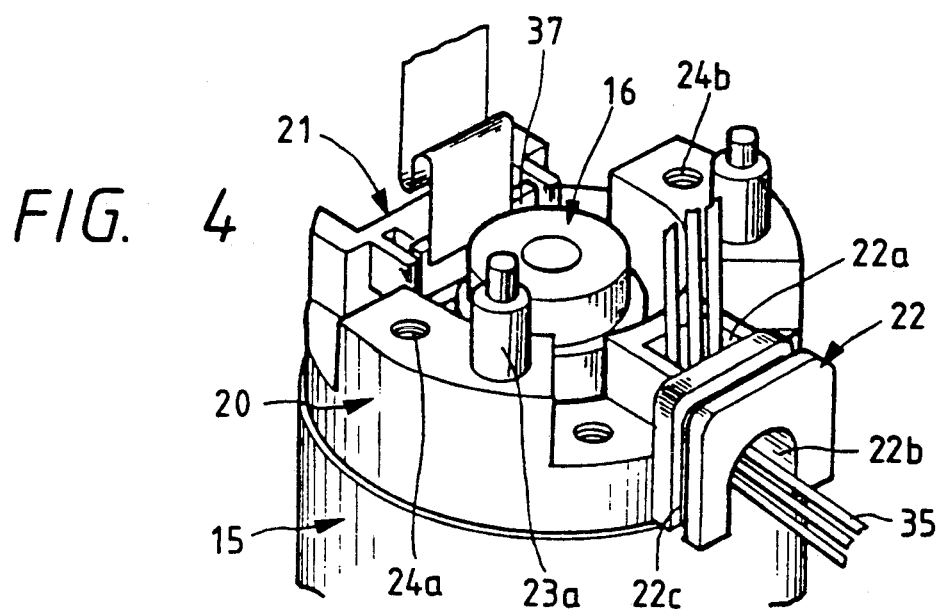
FIG. 4 is a perspective view for illustrating the second aspect of this invention, showing the process of providing external wiring in the encoder of FIG. 1.
Figure 5:
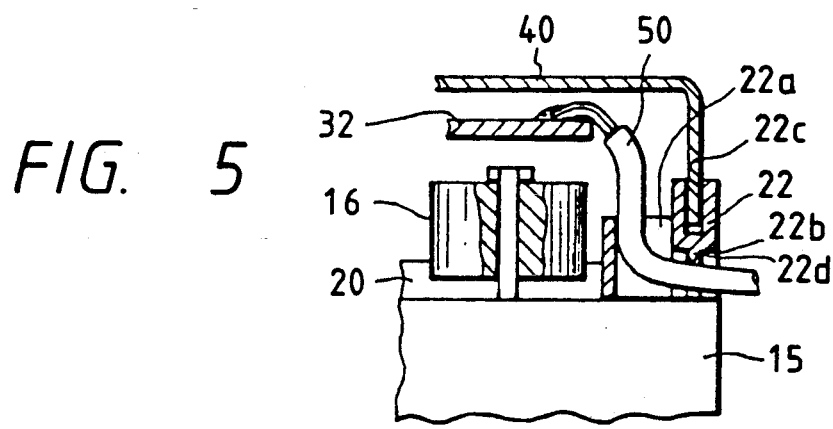
FIG. 5 is a side sectional view showing the essential part of another embodiment of the type of encoder in accordance with the second aspect of this invention, which is shown in FIG. 4.
Figure 6:
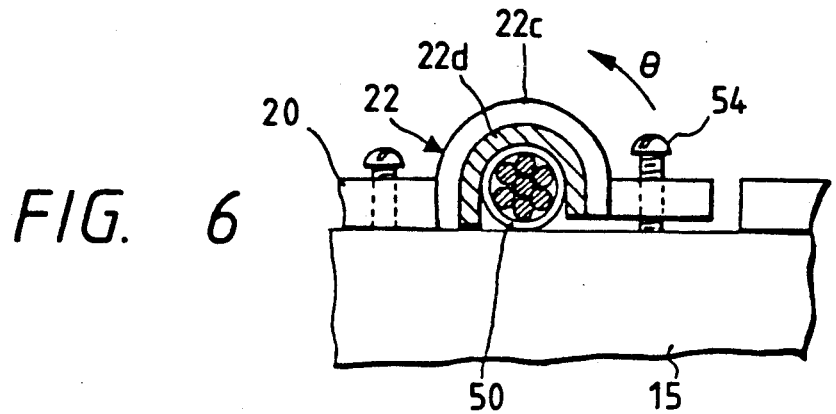
FIG. 6 is a front sectional view showing the essential part of the embodiment illustrated in FIG. 5.
Figure 7:
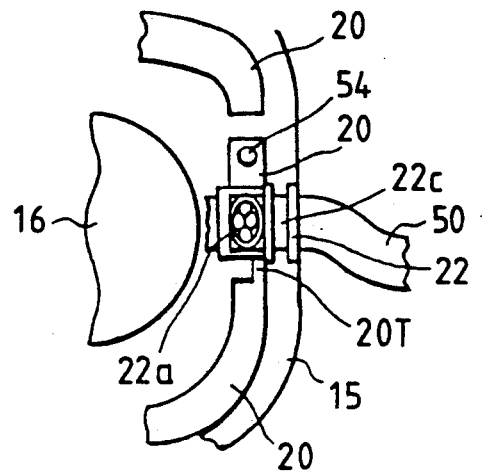
FIG. 7 is a plan sectional view showing the essential part of the embodiment illustrated in FIG. 5.

FIGS. 1 and 4 show an embodiment in accordance with the second aspect of this invention and FIGS. 5 to 7 show another embodiment in accordance with the same.

FIG. 1 is an exploded perspective view of the components of an encoder in accordance with this invention; FIG. 4 is a perspective view showing the essential part of the same in the condition in which they are assembled together; FIG. 5 is a side sectional view showing the essential part of the same; FIG. 6 is a front sectional view showing the essential part of the same; and FIG. 7 is a plan sectional view showing the essential part of the same.

First, an embodiment in accordance with the second aspect of this invention will be described with reference to FIGS. 1 and 4.

The harness 35 is connected to the printed board 32 through the top opening 22a and the side opening 22b of the bush section 22, which is integrally formed with the guide member 20. Formed integrally around the top opening 22a is a partition, which helps to prevent the magnetic drum 16 from coming into contact with the harness 35 while the encoder is in use. The inner diameter of the side opening 22b is made smaller than the total outer diameter of the lead wire section of this harness 35 so that no external tensile forces may not be directly applied to the connecting section between the harness 35 and the printed board 32. After the lead wire section has been inserted into the opening 22b to complete the wiring, the guide member 20 is fastened to the motor 15 by means of screws, which are passed through holes 26a, 26b and threaded into screw holes 30b and 30c. In some cases, the inner diameter of the side opening 22b may be larger than the total outer diameter of the lead wire section, depending on the number and type of wires. In such cases, a fixing means (not shown) which is similar to those used in the prior art and which has a diameter larger than that of the top opening 22a is adopted so as to secure the harness from slipping out.

When the components constituting the essential parts of the magnetic encoder have been mounted and adjusted, a cutout 45 formed in a cap 40, which constitutes the cover member, is fittingly engaged with a groove 22c provided in the outer periphery of the bush section 22. This cap 40 is fixed to the guide member 20, together with the printed board 32, by means of screw holes 24a, 24b formed in the guide member and screws 41, 41.

Thus, the cap 40 can be mounted on the guide member through a one-way mounting operation with respect to the mounting surface, with the guide member 20 fixed to the mounting surface of the motor 15 by means of screws 27, 28, 29 and screw holes 30a, 30b, 30c provided in the mounting surface, which is in a certain positional relationship with respect to the peripheral surface of the magnetic drum 16. Since the bush section 22 is integrally formed with the guide member 20, the mounting of the protecting section can be conducted, simultaneously with the mounting of the guide member 20, through a one-way mounting operation with respect to the mounting surface.

Accordingly, in addition to the reduction in the number of parts, simplification of the mounting operation and reduction in the mounting time can be attained since the protecting section for the harness 35 and the cap 40 can be assembled through one-way mounting.

Next, another embodiment in accordance with the second aspect of this invention will be described with reference to FIGS. 5 to 7.

In accordance with this embodiment, the lead wire section for external wiring can be secured from slipping out even if there is some difference between the inner diameter of the side opening 22b and the total outer diameter of the lead wire section.

The bush section 22, which is formed integrally with the guide member 20, is cut off from the guide member on one side so that it can be flexibly deformed in the direction indicated by arrow θ of FIG. 6, causing the inner diameter of the side opening 22b to be changed. Further, the bush section 22 is provided with a thin-walled portion 20T (FIG. 7) so that its deformation can be effected with less force. Provided on that side of this flexible bush section 22 which is cut off from the guide member 20, is a screw hole, through which a screw 54 is passed so as to be threaded into a screw hole provided on the mounting surface, thereby squeezing the outer cover of the cable 50 between the bush section 22 and the mounting surface to secure the cable from slipping out. Further, the side opening 22 of this bush section 22 has a protrusion 22d, which extends toward the cable 50. This protrusion 22d is adapted to be squeezed into the outer cover of the cable 50, thereby securing the cable still more positively from slipping out.

Thus, the cable 50 can be attached even if its outer diameter is somewhat larger than the diameter of the side opening 22b. Further, if the outer diameter of the cable 50 is somewhat smaller than the diameter of the side opening 22b, the requisite force for securing the cable from slipping out can be obtained by fastening the screw 54, which causes the protrusion 22d to be squeezed into the outer cover of the cable.

Thus, inn accordance with the first aspect of this invention, temporary-fixing members are provided on the retaining member that is fixed to the mounting surface, so that it is not necessary to employ a temporary-fixing jig. Accordingly, the positioning of the magneto-sensitive element can be performed with ease, and, at the same time, it is not necessary to perform the operation of removing the temporary jig, thus simplifying the mounting operation.

In accordance with the second aspect of this invention, no separate protecting member is needed, which not only leads to reduction in the number of parts but makes the mounting operation easier since the mounting operation can be conducted in a single direction with respect to the mounting surface, there being no unfavorable positional relationship between the wiring members and the protecting member.

What is claimed is:

1. A magnetic encoder including a magnetic scale mechanically connected to an object to be monitored so as to move together with said object, a magnetic code formed on a surface of said magnetic scale extending along the path of movement of said magnetic scale, a magneto-sensitive element which faces said magnetic code and which is arranged in such a manner as to detect the relative movement between said magneto-sensitive element and said magnetic code, a retaining member for removably receiving said magnetic scale and maintaining a constant position between said magneto-sensitive element and said magnetic code other than said path of movement, wherein the improvement comprises:

a pair of gripping members formed integrally with said retaining member so as to protrude toward the surface of said magnetic scale and to elastically grip said magneto-sensitive element therebetween, thereby permitting said magneto-sensitive element to be removably received by said gripping members, an abutting member disposed on said retaining member and positioned between said gripping members for positioning said magneto-sensitive element in a direction perpendicular to the direction in which said magneto-sensitive element is gripped between said gripping members, thereby keeping a constant gap between one surface of said magneto-sensitive element and said surface of said magnetic scale; and means for fixing said magneto-sensitive element to said retaining member.

2. A magnetic encoder as claimed in claim 1, wherein said abutting member is formed integrally with said retaining member and in such a manner that it abuts against a surface of said magneto-sensitive element which is opposite to a detecting surface provided thereon.

3. A magnetic encoder as claimed in claim 1, wherein said fixing means consists of a fluid adhesive which cures after application.

4. A magnetic encoder as claimed in claim 1, wherein said magneto-sensitive element is in the form of a quadrangular plate which is made thin in one direction; further wherein two opposite sides of said plate are held by said pair of gripping members; and further wherein said retaining member includes a support provided integrally thereon which abuts against a side of said plate which is not held by said gripping members.

5. A magnetic encoder is claimed in claim 1, wherein said object to be monitored comprises a motor having a rotatable shaft and wherein said scale consists of a magnetic drum which is adapted to rotate with the shaft of, said motor.

6. A magnetic encoder as claimed in claim 5, wherein said retaining member is directly mounted on an end surface of said motor through which its rotatable shaft protrudes.

7. A magnetic encoder including a mounting surface from which a movable section of an object to be monitored extends, a cover member which covers said mounting surface, a magnetic scale positioned between said cover member and said mounting surface and mechanically connected to said movable section so as to be movable therewith, a magnetic code formed on a surface of said magnetic scale extending along a path of movement of said magnetic scale, a magneto-sensitive element positioned to face the magnetic code and detect the relative movement between said magneto-sensitive element and said magnetic code, wiring members adapted for connection to a device outside said cover member for delivering output from said magneto-sensitive element and/or power to said magneto-sensitive element, wherein the improvement comprises:

a retaining member disposed between said cover member and said mounting surface and adapted to secure said wiring members between said cover member and said mounting surface and to secure said magneto-sensitive element; and a protecting section integrally formed with said retaining member, said protecting section preventing said wiring members from contacting said cover member and said magnetic scale, said protecting section having a first and a second side, said first side formed integrally with said retaining member, said second side separated from said retaining member and being flexibly deformable.

8. A magnetic encoder as claimed in claim 7 further comprising a fixing section formed integrally with said protecting section and adapted to fix said wiring member to said mounting surface by pressing said wiring member against said mounting surface.

9. A magnetic encoder as claimed in claim 7, wherein said protecting section is provided with an isolating partition which is formed integrally with said protecting section and which prevents said wiring member from being brought into contact with said magnetic scale.

10. A magnetic encoder as claimed in claim 7 further comprising a printed wiring board, supported by said retaining member, on which a plurality of circuit parts are mounted, wherein said wiring members include a sensor wiring member, one end of said sensor wiring member being connected to said magneto-sensitive element, the other end of said sensor wiring member being connected to said printed wiring board.

11. A magnetic encoder as claimed in claim 10, wherein said printed wiring board is fixed to said mounting surface through the intermediation of board support sections which are formed integrally with said retaining member.

12. A magnetic encoder as claimed in claim 7, wherein said cover member is fixed to said mounting surface through the intermediation of cover mounting sections which are formed integrally with said retaining member.

13. A magnetic encoder as claimed in claim 7, wherein said protecting section is provided with a screw hole and a protrusion formed integrally with said protecting section, said protecting section being made flexible so that it can deform when a screw is threaded into said screw hole and a screw hole correspondingly formed on said mounting surface, thereby causing said protrusion to be squeezed against said external wiring member.

14. A magnetic encoder as claimed in claim 7, wherein said object to be monitored comprises a motor having a rotatable shaft and further wherein said scale consists of a magnetic drum which is adapted to rotate with the shaft of said motor.

15. A magnetic encoder as claimed in claim 14, wherein said mounting surface comprises an end surface of said motor from which said rotatable shaft extends and wherein said retaining member is directly mounted on and fixed to said end surface of said motor.

* * * * *